(12) United States Patent
Misawa

(10) Patent No.: US 7,030,358 B2
(45) Date of Patent: Apr. 18, 2006

(54) IMAGING APPARATUS AND IMAGE RECORDING METHOD

(75) Inventor: Takeshi Misawa, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 11/124,123

(22) Filed: May 9, 2005

(65) Prior Publication Data
US 2005/0247858 A1 Nov. 10, 2005

(30) Foreign Application Priority Data
May 10, 2004 (JP) ............... 2004-139733

(51) Int. Cl.
H01L 27/00 (2006.01)
H04N 3/14 (2006.01)

(52) U.S. Cl. ............... 250/208.1; 348/294; 348/333.05

(58) Field of Classification Search ............ 250/208.1, 250/214 R; 348/229.1, 294, 333.05
See application file for complete search history.

(56) References Cited

U.S. PATENT DOCUMENTS
2004/0189841 A1 * 9/2004 Oda et al. ............... 348/294

FOREIGN PATENT DOCUMENTS
JP 2002-044515 A 2/2002
JP 2002-305684 A 10/2002
JP 2004159170 A * 6/2004

* cited by examiner

Primary Examiner—Kevin Pyo
(74) Attorney, Agent, or Firm—Birch, Stewart, Kolasch & Birch, LLP

(57) ABSTRACT

According to the present invention, a reduced image is generated only from one of high-sensitivity image information or low-sensitivity image information when RAW data is recorded, and the reduced image is recorded on a recording medium together with the RAW data (first and second RAW data). Thereby, it is possible to create the reduced image in a relatively short time. In this case, if a reduced image is generated from the high-sensitivity image information, a high-contrast image with a desirable S/N ratio can be acquired. If a reduced image is generated from the low-sensitivity image information, an image appropriately representing the content of a reproduction area of the RAW data can be acquired.

9 Claims, 9 Drawing Sheets

IMAGING APPARATUS AND IMAGE RECORDING METHOD

BACKGROUND OF THE INVENTION

1. Field of the Invention

The present invention relates to an imaging apparatus and an image recording method, and in particular to a technique suitable for a digital still camera capable of recording a wide dynamic range image and used for a RAW data recording function in which unprocessed data (RAW data) outputted from an imaging element such as a CCD is immediately recorded.

2. Related Art

Japanese Patent Application Laid-open No. 2002-44515 discloses a digital camera having a dynamic-range-magnification imaging mode and a two-screen imaging mode in addition to a usual imaging mode. When imaging is performed in the dynamic-range-magnification imaging mode or the two-screen imaging mode by the digital camera shown in the document, long exposure and short exposure are performed, and long-exposure image data and short-exposure image data of the same object are generated.

In the dynamic-range-magnification imaging mode, a synthesized image is generated from the long-exposure image data and the short-exposure image data, and compressed main image data and compressed thumbnail image data of this synthesized image are recorded on a recording medium in the form of a file.

In the two-screen imaging mode, each of the long exposure image data and the short exposure image data is recorded as a separate file, which includes compressed main image data and compressed thumbnail image data, to a recording medium, and a common extension is assigned to image files related to those.

Japanese Patent Application Laid-open No. 2002-305684 discloses an imaging system in which imaging is performed under different exposure conditions for the same object and at least two images obtained by the imaging are synthesized to obtain a wide dynamic range image. It is disclosed that, in this system, a thumbnail image is generated from the synthesized image, and the thumbnail is recorded together with the synthesized image (wide dynamic range image).

SUMMARY OF THE INVENTION

However, if more than two images taken under different exposure conditions are synthesized, and then a thumbnail is created from the synthesized image as in the dynamic-range-magnification imaging mode in Japanese Patent Application Laid-open No. 2002-44515 or as described in Japanese Patent Application Laid-open No. 2002-305684, a lot of time is required for signal processing. Especially, in a mode for recording RAW data in which image information acquired from an imaging element has not been processed, an imaging interval is generally longer because of a large amount of recording data. If a thumbnail is further created after the synthesis processing, a time is further required for the processing and the imaging interval is still longer.

Furthermore, when images recorded in the two-screen imaging mode of Japanese Patent Application Laid-open No. 2002-44515 are multi-displayed on a monitor, compressed thumbnail image data of long-exposure image data is read, reproduced and displayed. However, this has a disadvantage that a part of the long-exposure image data may be saturated depending on scenes and thereby it may be impossible to reproduce an accurate reproduction area of recorded image data (the long-exposure image data and the short-exposure image data).

The present invention has been made in consideration of the above situation, and its object is to provide an imaging apparatus and an image recording method capable of creating a reduced image suitable for simplified display in a short time and generating a reduced image capable of appropriately representing the content of a reproduction area of recorded image data when recording RAW data.

To achieve the above object, an imaging apparatus according to a first aspect of the present invention comprises a first imaging apparatus which takes an image of an object under imaging conditions with relatively high sensitivity to acquire high-sensitivity image information; a second imaging device which takes an image of an object under imaging conditions with relatively low sensitivity to acquire low-sensitivity image information; a reduced image generation device which generates a reduced image only from one of the high-sensitivity image information acquired by the first imaging device and the low-sensitivity image information acquired by the second imaging device; and a recording processing device which records first RAW data indicating the high-sensitivity image information acquired by the first imaging device, second RAW data indicating the low-sensitivity image information acquired by the second imaging device and the reduced image data generated by the reduced image generation device in association with one another.

According to the first aspect, images of an object are taken by the first imaging device and the second imaging device at the same time, or imaging is performed multiple times at very short time intervals. Thereby, the optical images of the object are converted to electric signals, and high-sensitivity image information and low-sensitivity image information are acquired. When each of the high-sensitivity image information acquired from the first imaging device and the low-sensitivity image information acquired from the second imaging device is recorded as RAW data (data which has not been processed by an image processing engine), a reduced image is generated only from one of the high-sensitivity image information acquired from the first imaging device and the low-sensitivity image information acquired from the second imaging device, and the reduced image is recorded on a recording medium together with the RAW data (first and second RAW data). Thus, it is possible to create a reduced image in a relatively short time.

It is also possible to configure the first imaging device to be also used as the second imaging device. In this case, imaging is performed multiple times under different exposure conditions at short intervals of time to acquire high-sensitivity image information and low-sensitivity image information.

The followings are examples of a method for recording a reduced image data and RAW data in association with each other: (1) an aspect in which data of a thumbnail, which is a reduced image, and RAW data are stored in the same image file; (2) an aspect in which a reference image, a reduced image different from a thumbnail, is created, and the file of the reference image and the file of RAW data are stored in the same folder, and (3) an aspect in which files are associated with one another by means of an extension or auxiliary information (such as tag information).

The S/N ratio of the high-sensitivity image information acquired according to the present invention is more desirable than that of the low-sensitivity image information. Therefore, by creating a reduced image from the high-sensitivity image information, a vivid (high-contrast) reduced image can be obtained. On the other hand, the dynamic range against brightness of the low-sensitivity image information is wider than that of the high-sensitivity image information. Therefore, by creating a reduced image from the low-sensitivity image information, it is possible to obtain the reduced image in which the luminance range of the entire image is represented more appropriately though the contrast is somewhat weak.

A second aspect of the present invention is an aspect of the imaging apparatus of the first aspect, wherein the reduced image generation device generates a reduced image only from the low-sensitivity image information.

In order to obtain a reduced image appropriately representing the content of a reproduction area of a recorded image, an aspect is preferable in which a reduced image is created from the low-sensitivity image information as shown in the second aspect.

A third aspect of the present invention is an aspect of the imaging apparatus of the first or second aspect, further comprising: a synthesis processing device which synthesizes the high-sensitivity image information and the low-sensitivity image information to generate synthesized image data; a mode switching device which switches a RAW recording mode for recording the first and second RAW data and a synthesis recording mode for recording the synthesized image data; and a power source supply control device which shuts off power source supply to a circuit section, including at least the synthesis processing device, which is not required for the RAW recording mode, if the RAW recording mode is selected.

By using the configuration in which power source to circuit sections unnecessary in the RAW recording mode can be separately shut off, it is possible to realize power saving in recording RAW data.

A fourth aspect of the present invention is an aspect of the imaging apparatus of any one of the first to third aspects, wherein an imaging element is used in which a lot of main light-sensitive pixels with a relatively narrow dynamic range and high sensitivity and sub light-sensitive pixels with a relatively wide dynamic range and low sensitivity are arranged in a predetermined array form and which has a structure enabling an image signal from each of the main light-sensitive pixels and the sub light-sensitive pixels by one exposure; and the main light-sensitive pixels function as the first imaging device, and the sub light-sensitive pixels function as the second imaging device.

The imaging element used in this invention aspect has a structure composed of compound pixels which are combination of main light-sensitive pixels and sub light-sensitive pixels. The main light-sensitive pixels and the sub light-sensitive pixels can optically acquire information of the same phase, and therefore, it is possible to acquire two pieces of image information with a different dynamic range (high-sensitivity image information and low-sensitivity image information) by performing imaging once.

A fifth aspect of the present invention provides an invention of a method which achieves the object. That is, an image recording method according to the fifth aspect comprises:

a first imaging process which takes an image of an object under imaging conditions with relatively high sensitivity to acquire high-sensitivity image information;

a second imaging process which takes an image of an object under imaging conditions with relatively low sensitivity to acquire low-sensitivity image information;

a reduced image generation process which generates a reduced image only from one of the high-sensitivity image information acquired by the first imaging process and the low-sensitivity image information acquired by the second imaging process; and a recording processing process which records first RAW data indicating the high-sensitivity image information acquired by the first imaging process, second RAW data indicating the low-sensitivity image information acquired by the second imaging process and the reduced image data generated by the reduced image generation process in association with one another.

According to the present invention, a reduced image is generated only from one of high-sensitivity image information or low-sensitivity image information when RAW data is recorded, and the reduced image is recorded on a recording medium together with the RAW data (first and second RAW data). Thereby, it is possible to create the reduced image in a relatively short time.

In this case, if a reduced image is generated from the high-sensitivity image information, a high-contrast image with a desirable S/N ratio can be acquired. If a reduced image is generated from the low-sensitivity image information, an image appropriately representing the content of a reproduction area of the RAW data can be acquired.

DETAILED DESCRIPTION OF THE PREFERRED EMBODIMENTS

Embodiments of an imaging apparatus and an image recording method according to the present invention will be now described below with reference to accompanying drawings.

Figure 1:
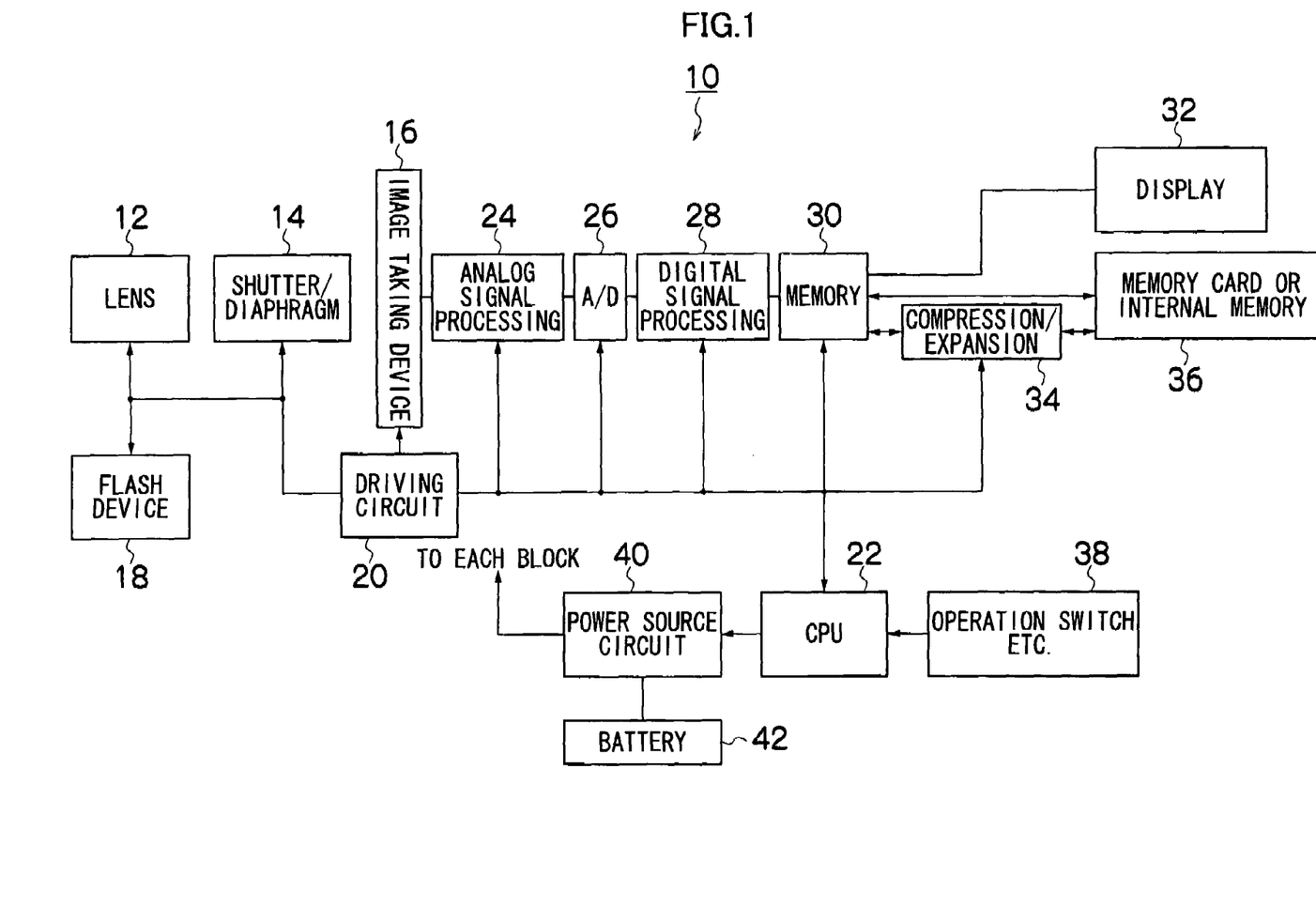
FIG. 1 is a block diagram showing the configuration of an imaging apparatus according to an embodiment of the present invention.

FIG. 1 is a block diagram showing the configuration of an imaging apparatus according to an embodiment of the present invention. The imaging apparatus 10 is a digital camera which converts an optical image of an object to digital image data and records it. A light passing through an imaging lens 12 and a shutter/diaphragm mechanism 14 is focused on the light receiving surface of an image taking device 16. The mechanical shutter prevents smears and the like from being caused by a light entering the image taking device 16 when a signal is read from the image taking device 16. The image taking device 16 may be configured with the mechanical shutter omitted. As the diaphragm mechanism, a single diaphragm or multiple switchable diaphragms can be applicable.

A flash device 18 which emits an auxiliary light on an object is capable of automatically emitting a light when necessary such as when the illuminance is low. Alternatively, it can be forced to emit a light, by a user operation. The flash device 18 is not limited to a device configuration using a xenon tube. Any other configuration may be used only if a device which emits an auxiliary light is used, such as a white LED and a lamp. If the sensitivity of the image taking device 16 is high, the flash device 18 may be omitted.

The image taking device 16 is driven by a timing signal generated by a timing generation circuit (not shown) in a driving circuit 20 and outputs an image signal. The driving circuit 20 includes driving circuits for causing the imaging lens 12, the shutter/diaphragm mechanism 14, the flash device 18 and the like to operate.

As the image taking device 16 of this example, a device is used which is configured to acquire high-sensitivity image information and low-sensitivity image information at the same time. That is, the image taking device 16 has a structure wherein a lot of light receiving cells, in which main light-sensitive pixels with a relatively narrow dynamic range and a high sensitivity (high-sensitivity pixel) and sub light-sensitive pixels with a relatively wide dynamic range and a low sensitivity (low-sensitivity pixel) are combined, are two-dimensionally arranged in a predetermined array form. An image of an object focused on the receiving surface of the image taking device 16 is converted by each pixel (light receiving element) to the amount of signal charge corresponding to the amount of incident light.

For example, each light receiving cell is structured to be divided in multiple light receiving areas each of which includes at least a main light-sensitive pixel and a sub light-sensitive pixel. At the upper part (the light incoming side) of each cell, there are arranged color filters of the same color components for main light-sensitive pixels and sub light-sensitive pixels in the same light receiving cell, and there is provided one microlens for each light receiving cell.

By means of the image taking device 16, signal charge can be accumulated in each of the main light-sensitive pixels and the sub light-sensitive pixels with only one exposure, and an image signal can be acquired from each of the main light-sensitive pixels and the sub light-sensitive pixels. Reading of a signal from each pixel may be performed at the same time or in chronological order. The image taking device 16 has an electronic shutter function of controlling a charge accumulation time (shutter speed) based on the timing of a shutter gate pulse. The operation of the image taking device 16 (exposure, reading of charge and the like) is controlled by a CPU 22 via the driving circuit 20.

An image signal outputted from the image taking device 16 is sent to an analog signal processing section 24, where processings such as analog gain and CDS (correlated double sampling) are performed. A signal generated by the analog signal processing section 24 is converted to a digital signal by an A/D conversion section 26 and sent to a digital signal processing section 28 as RAW data.

The digital signal processing section 28 performs processing according to operation modes, and acquired image data is temporarily stored in a memory 30. In the case of usual imaging (in modes other than the RAW recording mode), various image signal processings are performed here for the image signal inputted to the digital signal processing section 28, such as white balance adjustment, γ conversion, generation of a brightness/color difference (YC) signal, brightness correction, synthesis to a wide dynamic range image, conversion of image size (including generation of a reduced image) and edge enhancement correction, as required. The digital signal processing section 28 performs the image signal processings utilizing the memory 30, in accordance with an instruction from the CPU 22. The image data for which the required digital signal processings have been performed is stored in the memory 30.

When a picture being taken is displayed on an electronic display (an image monitor) 32, the content of the memory 30 is read, converted to a signal format for display (for example, a color composite picture signal in the NTSC method) and supplied to the display 32. Thereby, it is possible to display a real-time picture (through image) being captured by the image taking device 16 on the display 32. A photographer can check the angle of view (composition) from the picture shown on the display 32.

An image data acquired in response to input of an instruction to start recording, such as pressing down of a shutter button, is compressed in a predetermined compression format such as the JPEG format by a compression/expansion section 34 and recorded on a recording medium 36. The recording medium 36 for storing image data may be a recording medium included in the imaging apparatus 10 (internal memory) or may be a removal medium (a detachable external recording device) represented by a memory card. In some modes, recording of data may be performed without a compression process.

In the reproduction mode, image data is read out from the recording medium 36, and the image data read out is expanded by the compression/expansion section 34, converted to a signal for display and outputted to the display 32 via the memory 30.

A color liquid display is used as the display 32, for example. Other types of display device such as organic EL may be used instead of a liquid display. The display 32 can be used not only as an electronic finder for checking the angle of view in imaging as described above, but also as a device which reproduces and displays a recorded image or as a preview display device which checks the content of an image before it is recorded. The display 32 is also used as a display screen for a user interface, and information such as menu information, items to be selected and content to be set is displayed thereon as required.

The imaging apparatus 10 is provided with an operation section 38 for a user to input various instructions. The operation section 38 includes various operation switches such as a shutter button, a zoom switch and a mode switching switch. The shutter button is an operation device which inputs an instruction to start imaging and is configured by a two-stage stroke switch having a S1 switch to be on when the two-stage stroke switch is half-pressed and a S2 switch to be on when the two-stage stroke switch is full-pressed. When the S1 is on, AE and AF processings are performed, and when S2 is on, exposure for recording is performed. The zoom switch is an operation device which changes the imaging magnification or the reproduction magnification. The mode switching switch is an operation device which switches the imaging mode and the reproduction mode.

In addition to the above, the operation section 38 includes operation devices such as an imaging mode setting device which sets an optimum operation mode (such as a continuous shooting mode, an auto imaging mode, a manual imaging mode, a person mode, a scenery mode and a night view mode) based on the imaging purpose, a menu button which displays a menu screen on the display 32, a cross button which selects a desired item from the menu screen (a cursor movement operation device), an OK button which instructs determination of a selected item or execution of processing, a cancel button which erases a desired object such as a selected item, cancels the content of an instruction or inputs an instruction to restore the immediately previous operation condition, and a display button which switches on/off or display methods of the display 32 or switches display/non-display of an on-screen display (OSD).

The operation section 38 includes not only those configured as a push-type switch member, a dial member and a lever switch, but also those realized by a user interface, such as selection of a desired item from a menu screen.

The entire operation of the imaging apparatus 10 is under the overall control of the central processing unit (CPU) 22. That is, the CPU 22 functions as a device which controls the imaging system in accordance with a predetermined program as well as an operation device which performing various operations such as auto exposure (AE) operation, auto focus adjustment (AF) operation and auto white balance (AWB) control.

The CPU 22 controls each circuit of the imaging apparatus 10 based on an input signal from the operation section 38 and performs, for example, lens driving control, imaging operation control, control over reading of charge from the image taking device 16, image processing control, control over recording/reproduction of image data, control over reading from and writing to a recording medium, file management, display control over the display 32, power supply control and the like. The memory 30 is used as a temporary storage area for image data as well as a work area of the CPU 22.

Furthermore, in the imaging apparatus 10, there is provided a power source circuit 40 which operates in accordance with an instruction from the CPU 22. The power source circuit 40 includes a DC/DC converter, and power supplied from a battery 42 mounted on the imaging apparatus 10 or an external power source not shown is converted to required voltage by the power source circuit 40 and supplied to each circuit block in the apparatus. The battery 42 may be a primary cell or a secondary cell.

The imaging apparatus 10 of this example has a RAW recording mode in addition to a usual image recording mode, and a user can select a desired recording mode by operating the operation section 38 (for example, by performing a selection operation on the menu screen).

In the usual image recording mode, various processings are performed in the camera for image data acquired by imaging, and the image data is converted to a general-purpose image file format represented by JPEG and TIFF, and recorded. The image data recorded in this mode has an advantage that it can be easily browsed and managed with a common viewer (such as image browsing software). However, processings such as white balance adjustment, color correction and synchronization have been performed by an image processing engine specific to the camera for the image data, and this imposes restrictions on further processings to be performed for the image in the post-processing process.

By comparison, in the RAW recording mode, data which has just been read from the image taking device 16 and A/D converted (data generally referred to as "CCD-RAW data") is immediately recorded while unprocessed (without performing signal processing for reconfiguring the data as an image). Though the RAW data recorded in this mode requires image reconfiguration (development processing) with the use of a tool such as application software for image processing, it is possible to perform high-grade and flexible data processing by means of such a tool without impairing its plentiful tones. Accordingly, the mode is suitable for performing image processing works in accordance with the purpose of use the image or a photographer's representation intention, as in large-sized printing or high-grade printing.

Though the "RAW data" is described as A/D converted output which is recorded immediately (without processing), this does not mean that all signal processings are not performed at all in a strict meaning. For example, image data obtained after performing noise removal processing or defective pixel correction processing which performs interpolation for data of defective pixels (defects) or data for which only gain adjustment has been performed should be included in the concept of the RAW data because development processing (so-called processing for picture making) has not been performed for the image data.

Figure 2:
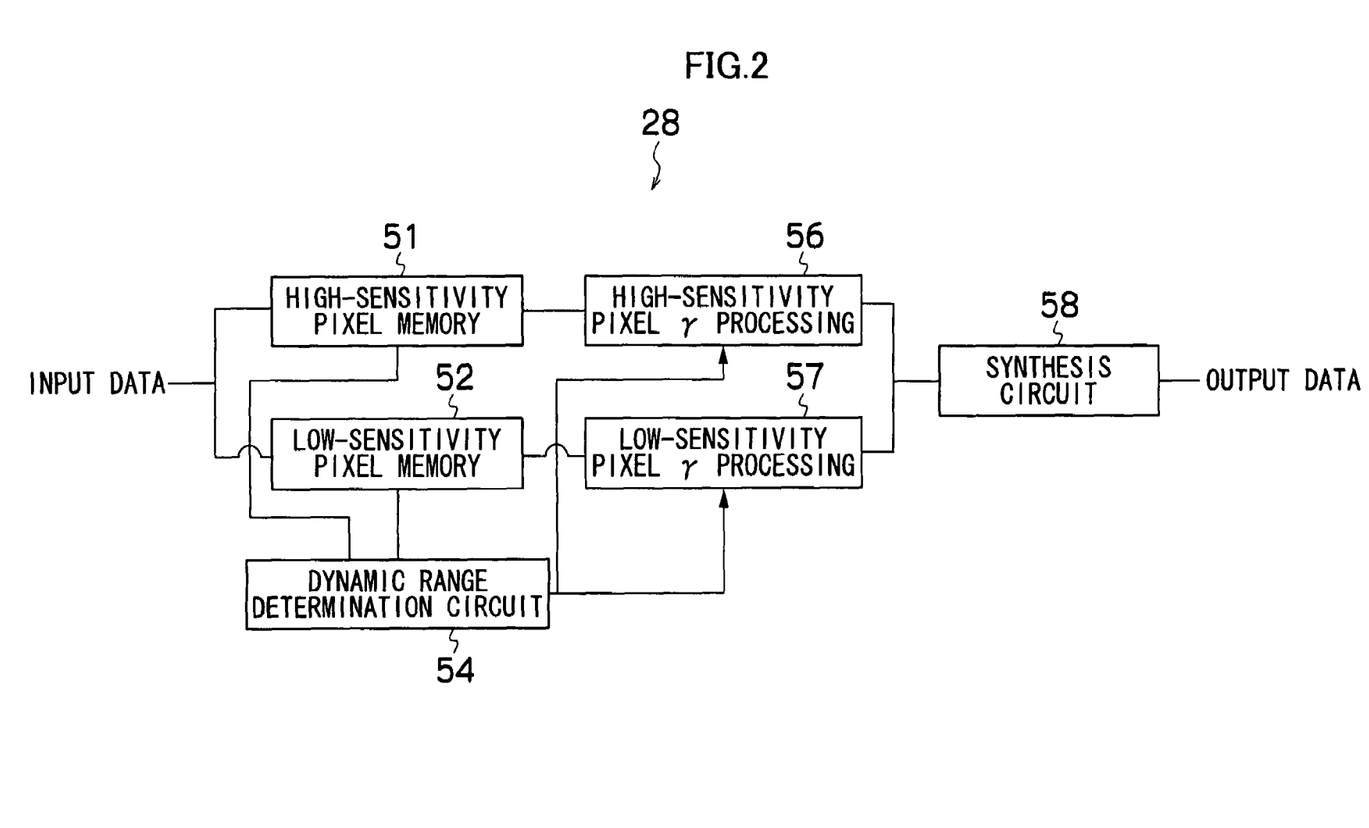
FIG. 2 is a block diagram showing the configuration by main sections of a digital signal processing section shown in FIG. 1.

FIG. 2 is a block diagram showing the configuration by main sections of the digital signal processing section 28. Here, a mode for recording a synthesized image acquired by wide dynamic range imaging is assumed as the normal image recording mode. There is shown an example of a circuit for creating a wide dynamic range image from high-sensitivity image data acquired from main light-sensitive pixels and low-sensitivity image data acquired from sub light-sensitive pixels.

As shown in FIG. 2, the digital signal processing section 28 is configured to include a high-sensitivity pixel memory 51, a low-sensitivity pixel memory 52, a dynamic range determination circuit 54, a high-sensitivity pixel γ processing section 56, a low-sensitivity pixel γ processing section 57 and a synthesis circuit 58. Each of the processing circuit sections (54 to 58) may be realized with hardware such as an integrated circuit, or its functions may be realized by software. Of course, realization by an appropriate combination thereof may be possible.

Among image data inputted to the digital signal processing section 28, high-sensitivity image data acquired from the main light-sensitive pixels of the image taking device 16 is temporarily stored in the high-sensitivity pixel memory 51, and low-sensitivity image data acquired from the sub light-sensitive pixels are temporarily stored in the low-sensitivity pixel memory 52.

The dynamic range determination circuit 54 refers to the high-sensitivity image data stored in the high-sensitivity pixel memory 51 and the low-sensitivity image data stored in the low-sensitivity pixel memory 52 to detect the luminance range of a taken scene (the contrast ratio of a taken image). Based on the detection result, the dynamic range determination circuit 54 controls each of γ values of the high-sensitivity pixel γ processing section 56 and the low-sensitivity pixel γ processing section 57 or controls the synthesis ratio (the mixture ratio) between the high-sensitivity image data and the low-sensitivity image data at the synthesis circuit 58.

The high-sensitivity image data stored in the high-sensitivity pixel memory 51 is sent to the synthesis circuit 58 after γ processing has been performed therefor at the high-sensitivity pixel γ processing section 56. Similarly, the low-sensitivity image data stored in the low-sensitivity pixel memory 52 is sent to the synthesis circuit 58 after γ processing has been performed therefor at the low-sensitivity pixel γ processing section 57. The high-sensitivity image data and the low-sensitivity image data inputted to the synthesis circuit 58 is synthesized at the synthesis circuit 58 in accordance with the synthesis ratio determined based on the determination result of the dynamic range determination circuit 54. Thus, synthesized image data is generated and outputted from the synthesis circuit 58 as output data.

After that, RGB synchronization processing (processing of performing interpolation to compensate spatial displacement of color signals accompanying arrangement of color filters of a single-plate CCD) is performed for this output data. FIG. 2 is only an example, and other signal processing methods may be possible.

The processing to be performed in the case of the RAW recording mode will be now described.

Figure 3:
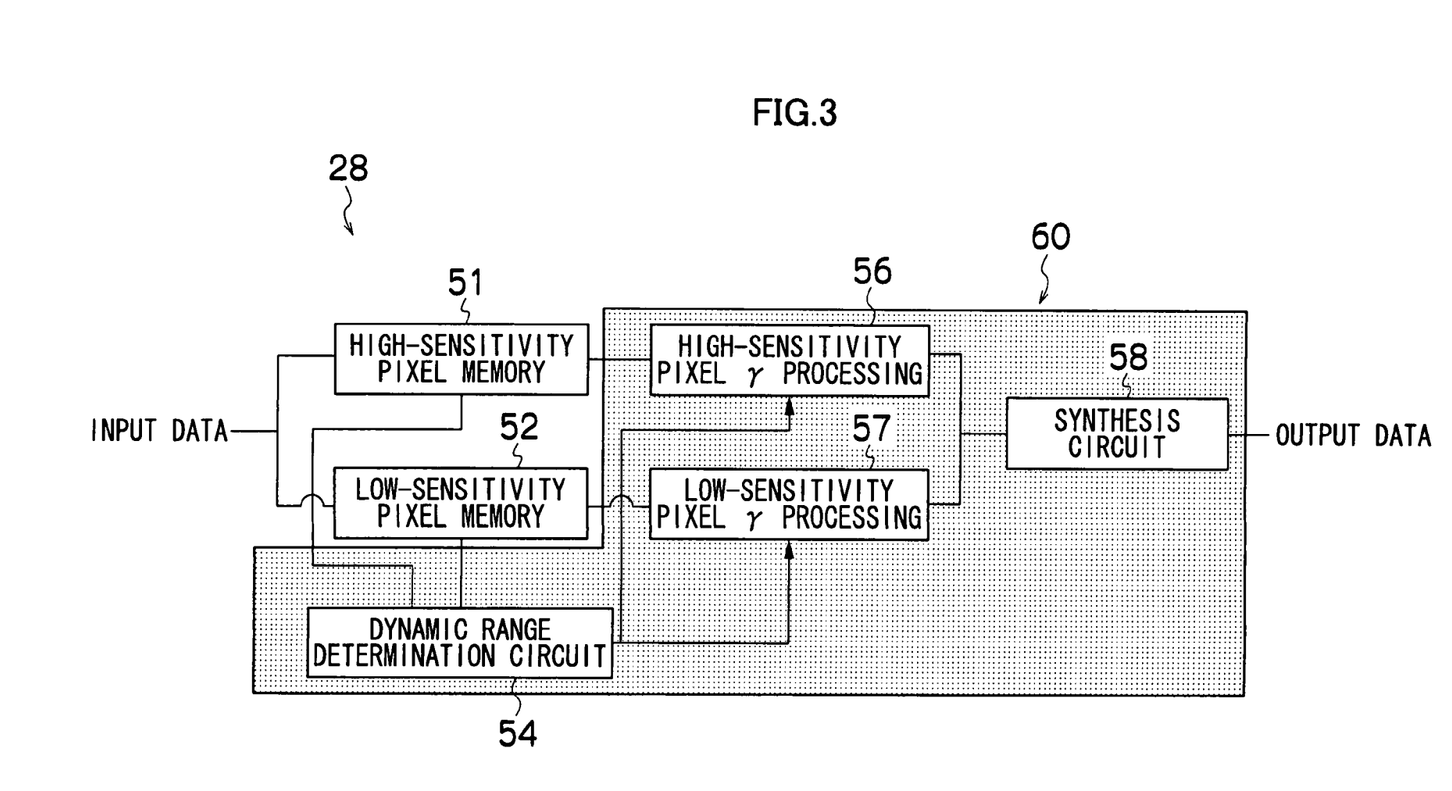
FIG. 3 is a block diagram in which a portion of the digital signal processing section shown in FIG. 2 to be replaced with software in the case of a RAW recording mode is differentiated.

FIG. 3 is a block diagram in which a portion of the digital signal processing section 28 to be replaced with software in the case of the RAW recording mode is differentiated. In the RAW recording mode, the processings in the area denoted by reference numeral 60 in FIG. 3 are omitted.

That is, high-sensitivity image data stored in the high-sensitivity pixel memory 51 and low-sensitivity image data stored in the low-sensitivity pixel memory 52 are to be output data immediately.

Figure 4:
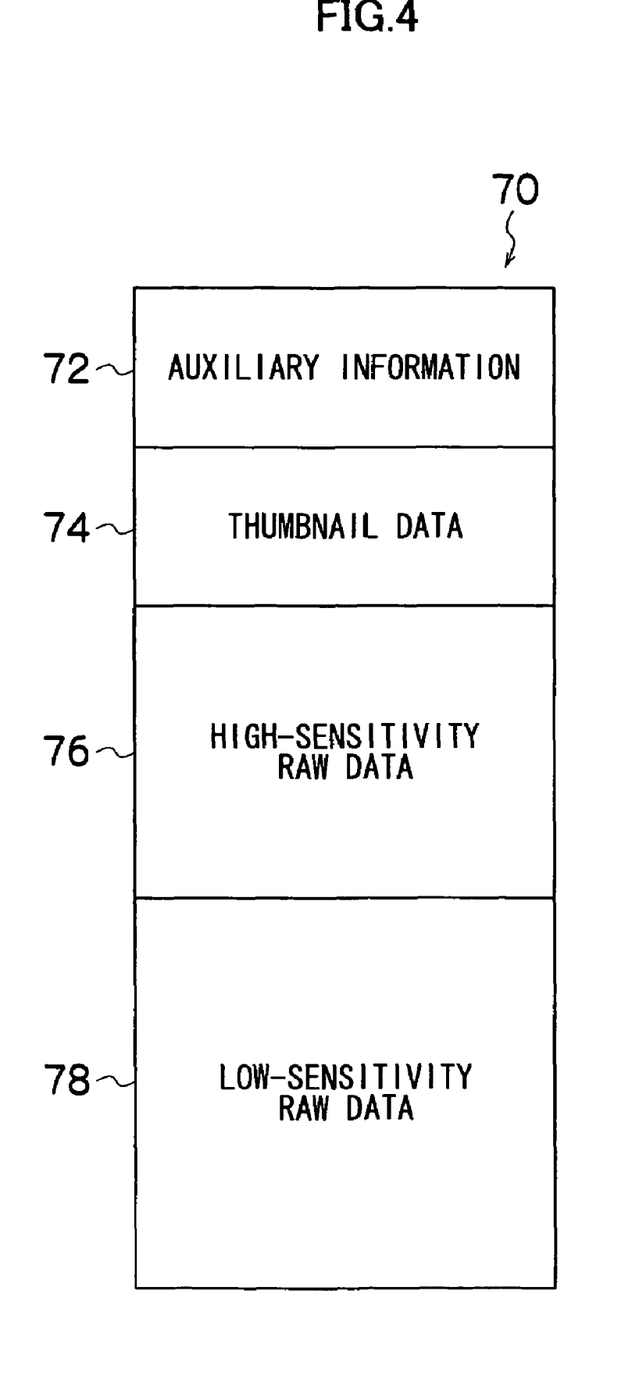
FIG. 4 is a conceptual diagram showing an example of the structure of an image file to be recorded in the RAW recording mode.

FIG. 4 is a conceptual diagram showing an example of the structure of an image file to be recorded in the RAW recording mode. As shown in the figure, an image file 70 generated in the RAW recording mode includes a header portion 72, a thumbnail data portion 74, a high-sensitivity RAW data portion 76 and a low-sensitivity RAW data portion 78.

On the header portion 72, various auxiliary information is recorded, such as time and data of imaging, imaging conditions, information about image input equipment (model) and the number of pixels. Data of a reduced image (for example, a thumbnail with QQVGA size: 120×160 pixels) generated only from one of high-sensitivity image data and low-sensitivity image data is recorded on the thumbnail data portion 74. Here, the thumbnail data is assumed to be generated from low-sensitivity image data.

On the high-sensitivity RAW data portion 76, RAW data of a high-sensitivity image acquired from high-sensitivity pixels (corresponding to first RAW data) is recorded, and on the low-sensitivity RAW data portion 78, raw data of a low-sensitivity image acquired from low-sensitivity pixels (corresponding to second RAW data) is recorded.

Figure 5:
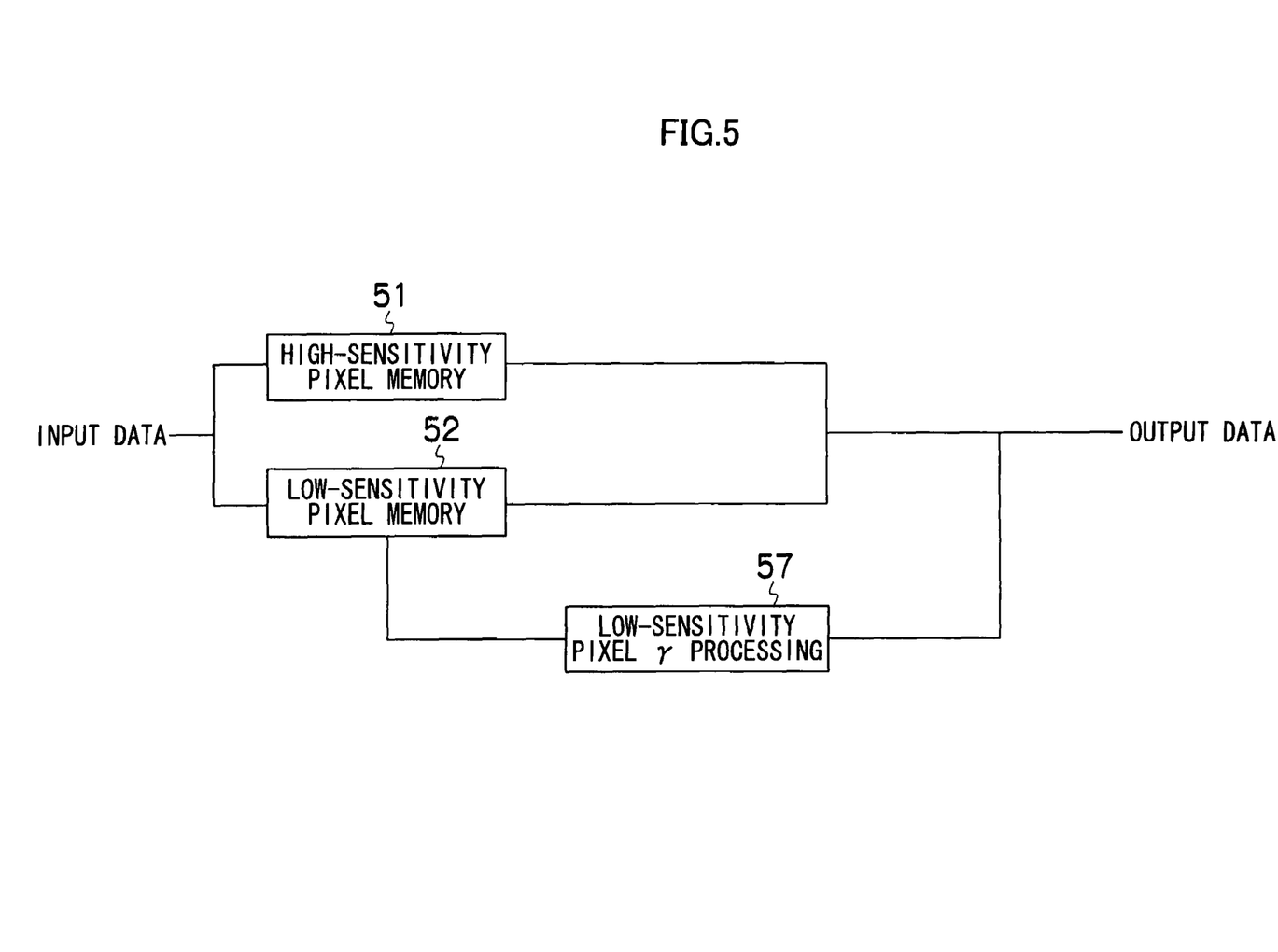
FIG. 5 is a block diagram showing the configuration required when a thumbnail is created only from low-sensitivity image data.

FIG. 5 is a block diagram showing the configuration required when a thumbnail is created only from low-sensitivity image data in the case of the RAW recording mode. As shown in the figure, when a thumbnail is created from low-sensitivity RAW data stored in the low-sensitivity pixel memory 52, γ processing of low-sensitivity pixels is also required to output a monitor image on the display 32 described with reference to FIG. 1.

Figure 6:
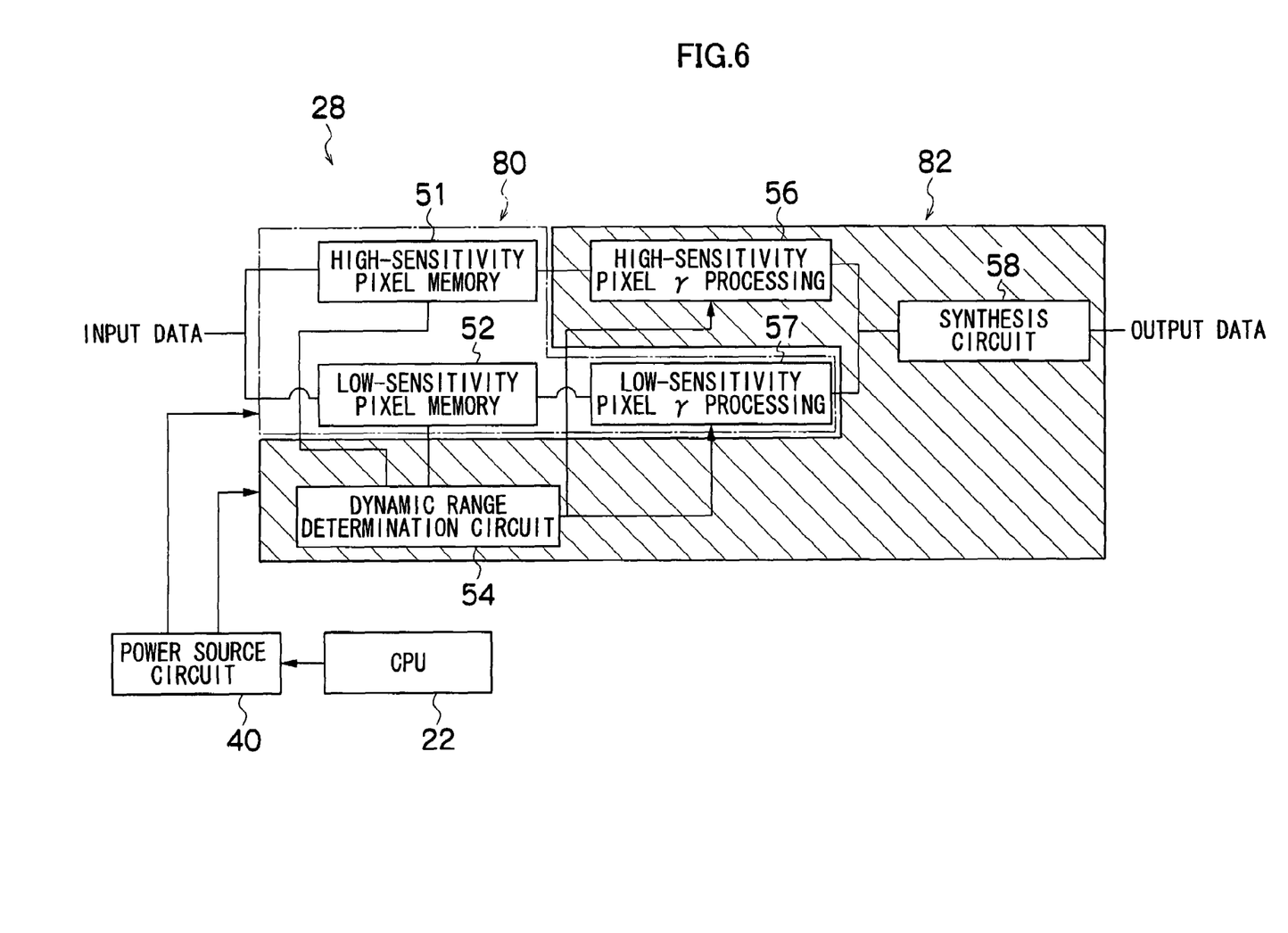
FIG. 6 illustrates an example of power source supply to each circuit block of the digital signal processing section shown in FIG. 2.

FIG. 6 illustrates an example of power source supply to each circuit block of the digital signal processing section 28 described with reference to FIG. 2. As already described, in the RAW recording mode, the circuit blocks in the area surrounded by an alternate long and short line denoted by reference numeral 80 in FIG. 6 (the high-sensitivity pixel memory 51, the low-sensitivity pixel memory 52 and the low-sensitivity pixel γ processing section 57) are required, but the circuit blocks (the dynamic range determination circuit 54, the high-sensitivity pixel γ processing section 56 and the synthesis circuit 58) in the shaded area denoted by reference numeral 82 are not used.

In consideration of the above situation, the imaging apparatus 10 of this embodiment is configured so that power source supply to each circuit block from the power source circuit 40 can be individually controlled or power source can be controlled for each of the block groups denoted by reference numerals 80 and 82.

The CPU 22 controls on/off of power source supply to each circuit block (or each block group) from the power source circuit 40 according to the recording modes and shuts off power source supply to unnecessary circuits. That is, in the RAW recording mode, power source supply to the block group denoted by reference numeral 82 is shut off to save power.

The operation of the imaging apparatus 10 configured as described above will be now described.

Figure 7:
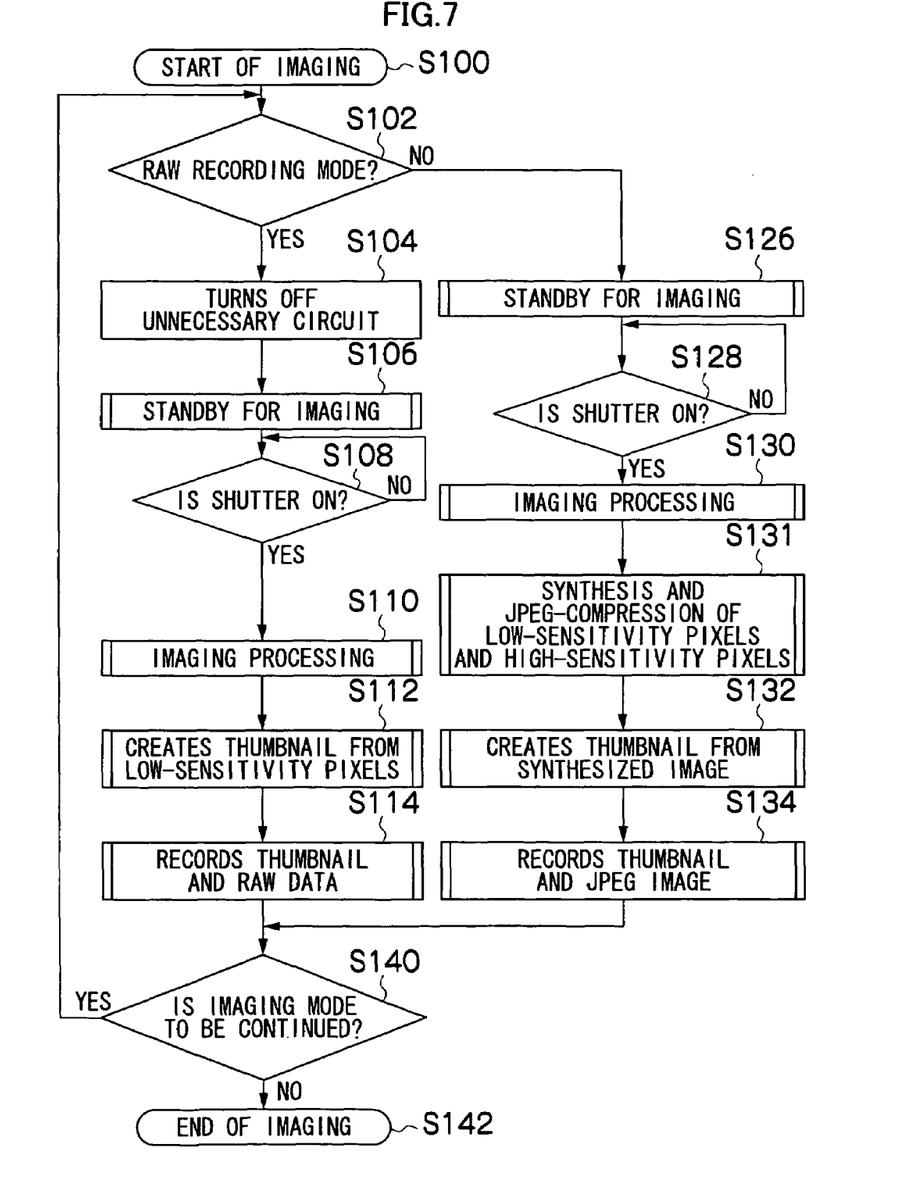
FIG. 7 is a flowchart showing the sequence of imaging.

FIG. 7 is a flowchart showing the sequence of imaging. When the power source for the imaging apparatus 10 is turned on while the imaging mode is selected, or when the reproduction mode is switched to the imaging mode while the power source is on, the control flow of FIG. 7 starts.

When the process of the imaging mode starts (step S100), the CPU 22 first determines whether or not the RAW recording mode is selected (step S102). If the RAW recording mode is selected, then the process proceeds to step S104, where power source supply to unnecessary circuits (circuits in the block group denoted by reference numeral 82 in FIG. 6) is turned off. After that, imaging standby processing including predetermined initial processing is performed (step S106), and if imaging is enabled, a shutter button operation (input of an instruction to perform imaging) is accepted.

The CPU 22 monitors input of a signal from the shutter button and determines whether a shutter-on signal has been inputted or not (step S108). If a shutter-on signal is not inputted, then the process repeats step S108 and waits for input of an instruction to perform imaging.

After that, if the shutter button is pressed by a photographer and a shutter-on signal is detected, then the process proceeds to step S110, where imaging processing for acquiring an image to be recorded (CCD exposure and reading of the signal) is performed. Thus, RAW data of a high-sensitivity image acquired from main light-sensitive pixels is stored in the high-sensitivity pixel memory 51, and RAW data of a low-sensitivity image acquired from sub light-sensitive pixels is stored in the low-sensitivity pixel memory 52.

Then, processing for creating a thumbnail from the RAW data of a low-sensitivity image data stored in the low-sensitivity pixel memory 52 is performed (step S112). That is, predetermined signal processing and pixel skipping are performed for the RAW data of a low-sensitivity image data to generate a thumbnail with a predetermined image size.

The generated thumbnail data and the RAW data (the high-sensitivity RAW data and the low-sensitivity RAW data) form one image file as described with reference to FIG. 4, and the file is recorded on a recording medium (step S114 of FIG. 7).

After the recording processing at step S114, the CPU 22 determines whether the imaging mode is to be continued or not (step S140). This determination is made from the condition of the mode switching switch and the like of the operation section 38. If the imaging mode is to be continued, then the process returns to step S102. On the contrary, if it is determined at step S140 that the imaging mode is not continued (for example, in the case that the mode is switched to the reproduction mode), then the imaging sequence is terminated (step S142).

If it is determined at the RAW recording mode determination processing of step S102 that the RAW recording mode is not selected (that is, in the case of the usual image recording mode), then the process proceeds to step S126. At step S126, imaging standby processing including predetermined initial processing is performed, and if imaging is enabled, a shutter button operation (input of an instruction to perform imaging) is accepted.

The CPU 22 monitors input of a signal from the shutter button and determines whether a shutter-on signal has been inputted or not (step S128). If a shutter-on signal is not inputted, then the process repeats step S128 and waits for input of an instruction to perform imaging.

After that, if the shutter button is pressed by a photographer and a shutter-on signal is detected, then the process proceeds to step S130, where imaging processing for acquiring an image to be recorded (CCD exposure and reading of the signal) is performed. Thus, RAW data of a high-sensitivity image acquired from main light-sensitive pixels is stored in the high-sensitivity pixel memory 51, and RAW data of a low-sensitivity image acquired from sub light-sensitive pixels is stored in the low-sensitivity pixel memory 52.

After that, a synthesized image is generated from the high-sensitivity image data stored in the high-sensitivity pixel memory 51 and the low-sensitivity image data stored in the low-sensitivity pixel memory 52, as described with reference to FIG. 2, and compressed data of the synthesized image is generated (step S131 of FIG. 7). Furthermore, a thumbnail image is created from the synthesized image generated during the process of step S131 (step S132).

The thumbnail data and the compressed data of the synthesized image generated as described above form one image file, and the file is recorded on the recording medium 36 (step S134).

After step S134, the process proceeds to step S140. Then, if the imaging mode is to be continued, the process returns to step S102. If it is determined at step S140 that the imaging mode is terminated, then the imaging sequence is terminated (step S142).

[Other Embodiments]

In the embodiment described above, an example of creating a thumbnail from low-sensitivity image data in the RAW recording mode has been described. However, an aspect is also preferable in which creating a thumbnail from high-sensitivity image data and creating a thumbnail from low-sensitivity image data are switched according to imaging scenes.

For example, the luminance range of a recorded image is determined with the use of the dynamic range determination circuit 54 described with reference to FIG. 2. Based on the determination result, a thumbnail is created from high-sensitivity image data when the luminance range is below a predetermined threshold, and from low-sensitivity image data when the luminance range is above a predetermined threshold. The "threshold" to be a switching determination criterion for creation of a thumbnail is set from a viewpoint of whether the thumbnail image can appropriately represent the content of the reproduction area of the recorded image.

Figure 8:
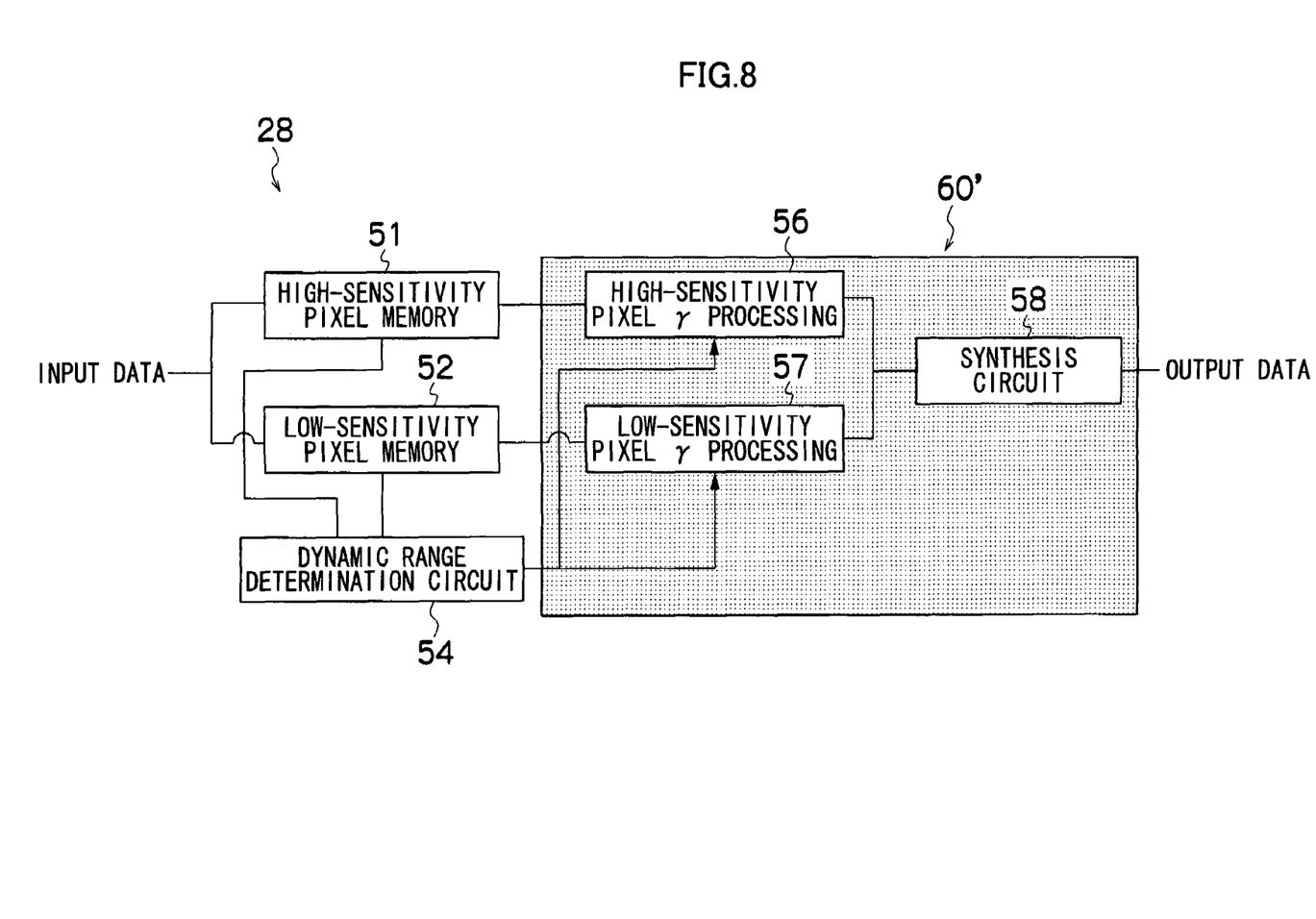
FIG. 8 is a block diagram showing the configuration by main sections of another embodiment of the present invention.

Thus, in the case of the configuration in which the processing for creating a thumbnail is switched according to the result of determination by the dynamic range determination circuit 54, the processings in the area denoted by reference numeral 60' in FIG. 8 are omitted. The portions in FIG. 8 which are identical or similar to those in FIG. 3 are denoted by the same reference numerals, and description thereof will be omitted.

Figure 9:
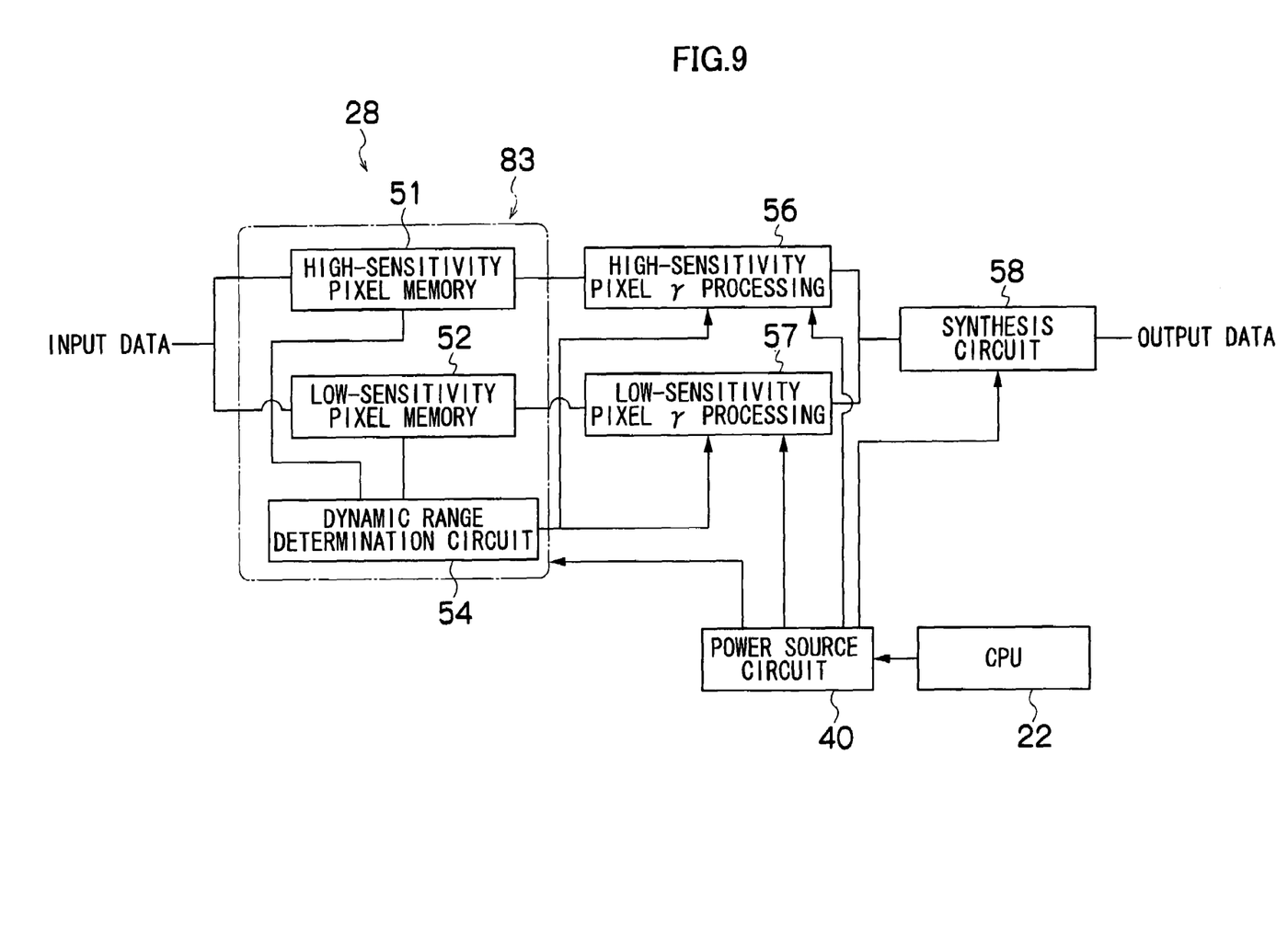
FIG. 9 illustrates another example of power source supply to each circuit block.

In this aspect, it is preferable that a power source supply route to a block group 83 including the high-sensitivity pixel memory 51, the low-sensitivity pixel memory 52 and the dynamic range determination circuit 54, and respective power source supply routes to the high-sensitivity pixel γ processing section 56, the low-sensitivity pixel γ processing section 57 and the synthesis circuit 58 are configured so that on/off control for each route can be individually controlled as shown in FIG. 9, and that power source supply to an unused circuit block is shut off. The portions in FIG. 9 which are identical or similar to those in FIG. 6 are denoted by the same reference numerals, and description thereof will be omitted.

[Variation 1]

With regard to a method of recording RAW data, an example of generating one image file has been described with reference to FIG. 4. However, the application scope of the present invention is not limited to the example. For example, there is an aspect in which RAW data consisting of high-sensitivity RAW data and low-sensitivity RAW data forms one file, and a reduced image (a thumbnail or a reference image different from a thumbnail) created only from one of the high-sensitivity RAW data or the low-sensitivity RAW data forms another file. In this case, an aspect in which association information is recorded on a header portion or the like of the file as auxiliary information or an aspect in which both files are integrated and stored in the same folder are preferred so that both files can be associated with each other.

Furthermore, if an RAW data file and a reduced image file are recorded as separate files, an aspect is also conceivable in which the reduced image file is stored in a dedicated folder (for example, a folder exclusively for reference images) after the files are associated with each other.

[Variation 2]

In the embodiment described above, a single-plate CCD is used as the image taking device 16. However, the image taking device 16 is not limited to a CCD-type device, and devices in accordance with other methods such as a CMOS-type device may be also used. It is also possible to use configuration with multiple image taking devices, such as a three-plate device.

In the embodiment described above, an example has been shown in which a device having main light-sensitive pixels with a high sensitivity and sub light-sensitive pixel with a low sensitivity is used as the image taking device 16, and high-sensitivity imaging and low-sensitivity imaging are performed with one exposure (at the same time). However, the application scope of the present invention is not limited to this example.

For example, an aspect is also possible in which imaging is performed multiple times (at least twice) under different exposure conditions at short time intervals to acquire high-sensitivity image data and low-sensitivity image data. In this case, it is possible to use an imaging element with a configuration in which pixel cells of the single kind, which are not differentiated as main light-sensitive pixels and sub light-sensitive pixels, are arranged as an image taking device.

The application scope of the present invention is not limited to a digital camera. The present invention can be applied to other imaging apparatuses provided with an electronic imaging function, such as a video camera, a DVD camera, a mobile telephone with a camera, a PDA with a camera and a mobile computer with a camera.

What is claimed is:

1. An imaging apparatus, comprising:
   a first imaging device which takes an image of an object under imaging conditions with relatively high sensitivity to acquire high-sensitivity image information;
   a second imaging device which takes an image of an object under imaging conditions with relatively low sensitivity to acquire low-sensitivity image information;
   a reduced image generation device which generates a reduced image only from one of the high-sensitivity image information acquired by the first imaging device or the low-sensitivity image information acquired by the second imaging device; and
   a recording processing device which records first RAW data indicating the high-sensitivity image information acquired by the first imaging device, second RAW data indicating the low-sensitivity image information acquired by the second imaging device and the reduced image data generated by the reduced image generation device in association with one another.

2. The imaging apparatus according to claim 1, wherein the reduced image generation device generates a reduced image only from the low-sensitivity image information.

3. The imaging apparatus according to claim 1, further comprising:
   a synthesis processing device which synthesizes the high-sensitivity image information and the low-sensitivity image information to generate synthesized image data;
   a mode switching device which switches a RAW recording mode for recording the first and second RAW data and a synthesis recording mode for recording the synthesized image data; and
   a power source supply control device which shuts off power source supply to a circuit section, including at least the synthesis processing device, which is not required for the RAW recording mode, if the RAW recording mode is selected.

4. The imaging apparatus according to claim 2, further comprising:
   a synthesis processing device which synthesizes the high-sensitivity image information and the low-sensitivity image information to generate synthesized image data;
   a mode switching device which switches a RAW recording mode for recording the first and second RAW data and a synthesis recording mode for recording the synthesized image data; and
   a power source supply control device which shuts off power source supply to a circuit section, including at least the synthesis processing device, which is not required for the RAW recording mode, if the RAW recording mode is selected.

5. The imaging apparatus according to claim 1, wherein an imaging element is used in which a lot of main light-sensitive pixels with a relatively narrow dynamic range and high sensitivity and sub light-sensitive pixels with a relatively wide dynamic range and low sensitivity are arranged in a predetermined array form and which has a structure enabling an image signal from each of the main light-sensitive pixels and the sub light-sensitive pixels by one exposure; and the main light-sensitive pixels function as the first imaging device, and the sub light-sensitive pixels function as the second imaging device.

6. The imaging apparatus according to claim 2, wherein an imaging element is used in which a lot of main light-sensitive pixels with a relatively narrow dynamic range and high sensitivity and sub light-sensitive pixels with a relatively wide dynamic range and low sensitivity are arranged in a predetermined array form and which has a structure enabling an image signal from each of the main light-sensitive pixels and the sub light-sensitive pixels by one exposure; and the main light-sensitive pixels function as the first imaging device, and the sub light-sensitive pixels function as the second imaging device.

7. The imaging apparatus according to claim 3, wherein an imaging element is used in which a lot of main light-sensitive pixels with a relatively narrow dynamic range and high sensitivity and sub light-sensitive pixels with a relatively wide dynamic range and low sensitivity are arranged in a predetermined array form and which has a structure enabling an image signal from each of the main light-sensitive pixels and the sub light-sensitive pixels by one exposure; and the main light-sensitive pixels function as the first imaging device, and the sub light-sensitive pixels function as the second imaging device.

8. The imaging apparatus according to claim 4, wherein an imaging element is used in which a lot of main light-sensitive pixels with a relatively narrow dynamic range and high sensitivity and sub light-sensitive pixels with a relatively wide dynamic range and low sensitivity are arranged in a predetermined array form and which has a structure enabling an image signal from each of the main light-sensitive pixels and the sub light-sensitive pixels by one exposure; and the main light-sensitive pixels function as the first imaging device, and the sub light-sensitive pixels function as the second imaging device.

9. An image recording method, comprising:

a first imaging process which takes an image of an object under imaging conditions with relatively high sensitivity to acquire high-sensitivity image information;

a second imaging process which takes an image of an object under imaging conditions with relatively low sensitivity to acquire low-sensitivity image information;

a reduced image generation process which generates a reduced image only from one of the high-sensitivity image information acquired by the first imaging process and the low-sensitivity image information acquired by the second imaging process; and a recording processing process which records first RAW data indicating the high-sensitivity image information acquired by the first imaging process, second RAW data indicating the low-sensitivity image information acquired by the second imaging process and the reduced image data generated by the reduced image generation process in association with one another.

* * * * *